(12) United States Patent
Fahrbach

(10) Patent No.: US 12,019,229 B2
(45) Date of Patent: Jun. 25, 2024

(54) ILLUMINATION ARRANGEMENT FOR A MICROSCOPE, MICROSCOPE AND METHOD FOR ILLUMINATING A SAMPLE VOLUME IN A MICROSCOPE

(71) Applicant: LEICA MICROSYSTEMS CMS GMBH, Wetzlar (DE)

(72) Inventor: Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 726 days.

(21) Appl. No.: 17/265,531

(22) PCT Filed: Jul. 19, 2019

(86) PCT No.: PCT/EP2019/069526
§ 371 (c)(1),
(2) Date: Apr. 21, 2021

(87) PCT Pub. No.: WO2020/030410
PCT Pub. Date: Feb. 13, 2020

(65) Prior Publication Data
US 2022/0373778 A1   Nov. 24, 2022

(30) Foreign Application Priority Data

Aug. 10, 2018   (DE) .................... 10 2018 213 543.6
Dec. 21, 2018   (DE) .................... 10 2018 222 839.6

(51) Int. Cl.
G02B 21/08   (2006.01)
(52) U.S. Cl.
CPC .................. G02B 21/086 (2013.01)
(58) Field of Classification Search
CPC .... G02B 21/086; G02B 5/001; G02B 5/1876; G02B 3/02; G02B 21/00; G02B 21/0004;
(Continued)

(56) References Cited

U.S. PATENT DOCUMENTS

2013/0286181 A1 * 10/2013 Betzig .................. H04N 7/18
348/79
2019/0170995 A1   6/2019 Siebenmorgen et al.
(Continued)

FOREIGN PATENT DOCUMENTS

DE   102016212020 A1   1/2018
DE   102018006971 A1 * 3/2020
(Continued)

OTHER PUBLICATIONS

Vettenburg, Tom et al: "Light-sheet microscopy using an Airy beam", Nature Methods, Bd. 11, Nr. 5, Apr. 6, 2014, pp. 541-544, XP055217022, UK.
(Continued)

*Primary Examiner* — Arnel C Lavarias
(74) *Attorney, Agent, or Firm* — LEYDIG, VOIT & MAYER, LTD.

(57) ABSTRACT

A illumination arrangement for a microscope for illuminating a sample with a light sheet includes an illumination input configured to feed an illumination beam along an optical axis of the illumination arrangement and an illumination output which faces a sample side and is configured to output the illumination beam to the sample side. A focusing optical system is provided with a set depth of focus. At least one optical modification element is configured to geometrically modify the illumination beam. Different rays of the illumination beam intersect the optical axis within an axis intersection region at the illumination output. The axis intersection region extends over at least the depth of focus of the focusing optical system along the optical axis.

13 Claims, 8 Drawing Sheets

(58) Field of Classification Search
CPC .............. G02B 21/002; G02B 21/0024; G02B 21/0032; G02B 21/0076; G02B 21/006; G02B 21/06; G02B 21/36; G02B 21/361; G01N 21/6456; G01N 21/6458; G01N 2021/6463; G01N 2021/6478
USPC ....... 359/370, 362, 363, 368, 369, 385, 388, 359/390
See application file for complete search history.

(56) References Cited

U.S. PATENT DOCUMENTS

2019/0204580 A1* 7/2019 Fahrbach ............ G02B 21/0076
2022/0269058 A1* 8/2022 Liu .................... G02B 21/0032

FOREIGN PATENT DOCUMENTS

| WO | WO 03/012528 A2 | 2/2003 |
| WO | WO 2012/003259 A1 | 1/2012 |
| WO | WO 2016/016642 A1 | 2/2016 |

OTHER PUBLICATIONS

Duocastella, Marti et al: "Selectable light-sheet uniformity using tuned axial scanning" Microscopy Research and Technique, vol. 80, Nr. 2, Feb. 1, 2017 (Feb. 1, 2017), pp. 250-259, XP055536570, Wiley Periodicals, Inc., USA.

Kozawa, Yuichi and Shunichi Sato: "Long depth-of-focus imaging by a non-diffracting optical needle under strong aberration", 2017 Conference on Lasers and Electro-Optics (Cleo), the Optical Society, May 14, 2017 (May 14, 2017), pp. 1-2, XP033238577, San Jose, CA, USA.

Ritter, Jörg G et al: "A cylindrical zoom lens unit for adjustable optical sectioning in light sheet microscopy" Biomedical Optics Express, vol. 2, Nr. 1, Jan. 1, 2011, pp. 185-193, XP055137860, Optical Society of America, USA.

Acebal P. et al: "Generation of High-Quality Tunable One-Dimensional Airy Beams Using the Aberrations of a Single Lens", IEEE Photonics Journal, IEEE, USA, vol. 4, Nr. 5, Oct. 2012, pp. 1273-1280, XP011488198.

* cited by examiner

ILLUMINATION ARRANGEMENT FOR A MICROSCOPE, MICROSCOPE AND METHOD FOR ILLUMINATING A SAMPLE VOLUME IN A MICROSCOPE

CROSS-REFERENCE TO PRIOR APPLICATIONS

This application is a U.S. National Phase Application under 35 U.S.C. § 371 of International Application No. PCT/EP2019/069526, filed on Jul. 19, 2019, and claims benefit to German Patent Applications Nos. DE 10 2018 213 543.6, filed on Aug. 10, 2018, and DE 10 2018 222 839.6, filed on Dec. 21, 2018. The International Application was published in German on Feb. 13, 2020, as WO 2020/030410 under PCT Article 21(2).

FIELD

The invention relates to an illumination arrangement for a microscope, in particular a light sheet or selective plane illumination microscopy (SPIM) microscope or an oblique plane microscope, such as an oblique plane microscopy (OPM) or swept confocally-aligned planar excitation (SCAPE) microscope, for illuminating a sample with a light sheet, wherein the illumination arrangement comprises an illumination input for feeding an illumination beam along an optical axis of the illumination arrangement, an illumination output which faces a sample side and which serves to output the illumination beam to the sample side, and a focusing optical system with a set depth of focus.

Further, the invention relates to a microscope, in particular a light sheet or SPIM microscope or an oblique plane microscope, such as an OPM or SCAPE microscope, and a method for illuminating a sample volume in a microscope, in particular in a light sheet or SPIM microscope or in an oblique plane microscope, such as an OPM or SCAPE microscope.

BACKGROUND

What is common to the aforementioned microscopes is that a sample is illuminated by a so-called light sheet, which extends in two-dimensional fashion and which has the smallest extent along the thickness direction perpendicular to the two-dimensional extent. This is referred to as a static light sheet, whereas a so-called virtual light sheet only arises as a result of an illumination beam with, e.g., a round beam cross section being focused and scanned along a direction perpendicular to the propagation direction and perpendicular to the thickness direction such that a light sheet appears to arise in the case of a sufficiently fast scanning movement.

The light sheet should be as thin as possible so as to only illuminate a limited region of the sample along the detection direction. However, a very thin light sheet has a depth of focus that is too small, i.e., an extent along the propagation direction that is too small to illuminate the sample over a large area with the thin light sheet.

In such a case, a plurality of scanning steps are cascaded to generate a longer, so-called virtual light sheet. This is accompanied by longer recording times.

SUMMARY

In an embodiment, the present invention provides an illumination arrangement for a microscope for illuminating a sample with a light sheet. The illumination arrangement includes an illumination input configured to feed an illumination beam along an optical axis of the illumination arrangement and an illumination output which faces a sample side and is configured to output the illumination beam to the sample side. A focusing optical system is provided with a set depth of focus. At least one optical modification element is configured to geometrically modify the illumination beam. Different rays of the illumination beam intersect the optical axis within an axis intersection region at the illumination output. The axis intersection region extends over at least the depth of focus of the focusing optical system along the optical axis.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
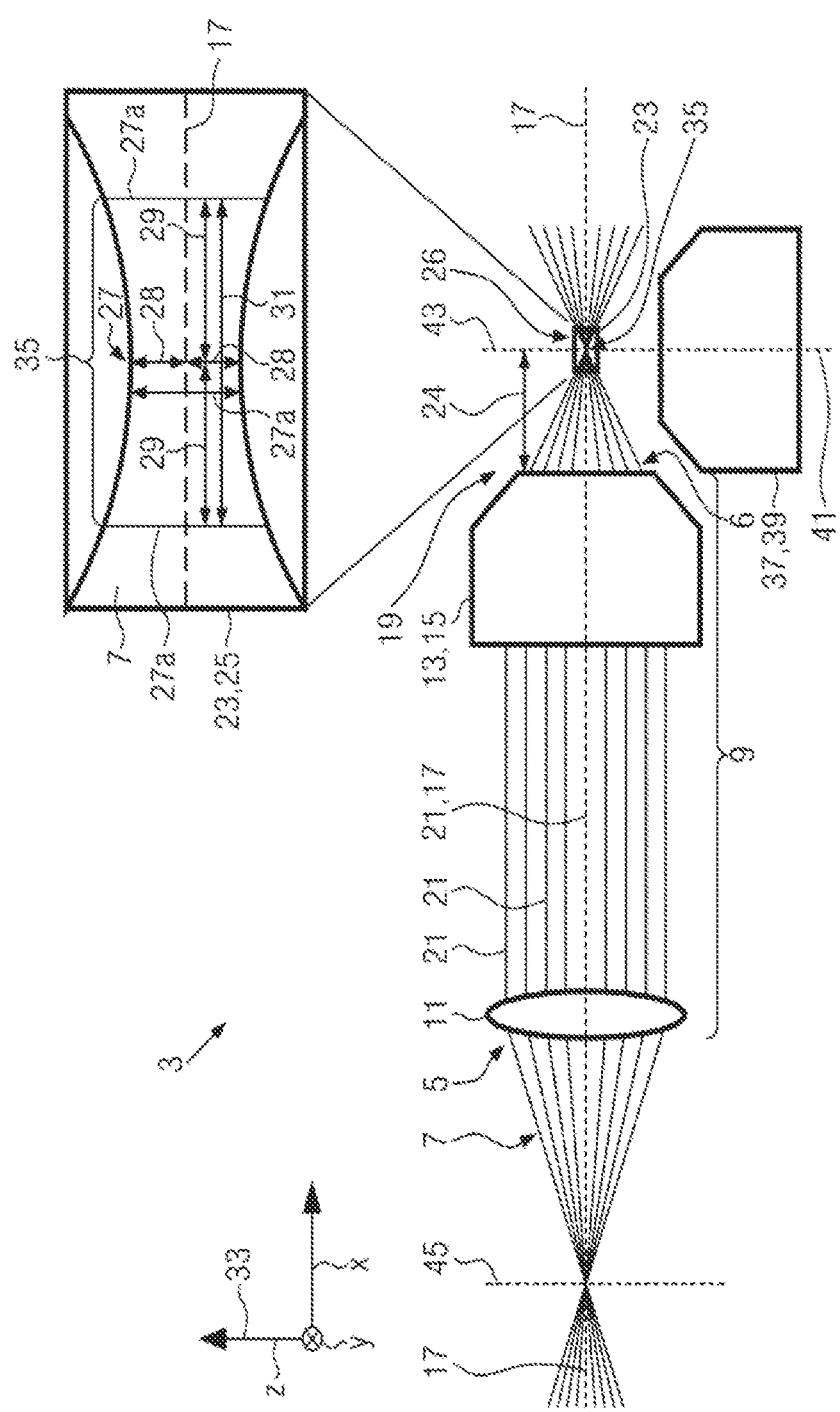
FIG. 1 shows a schematic illustration of an SPIM microscope in the prior art.

Embodiments of the present invention provide an illumination arrangement, a microscope and a method which permit shorter recording times.

The enabling of shorter recording times is achieved according to an embodiment of the present invention by an illumination arrangement having at least one optical modification element for the geometric modification of the illumination beam, different rays of the illumination beam intersecting the optical axis within an axis intersection region at the sample-side illumination output of the illumination arrangement, and by virtue of the axis intersection region extending over at least the depth of focus of the focusing optical system along the optical axis.

The enabling of shorter recording times is also achieved according to an embodiment of the present invention by a microscope comprising a sample volume and an illumination arrangement according to an embodiment of the invention for illuminating the sample volume with a light sheet.

The enabling of shorter recording times is also achieved according to an embodiment of the present invention by a method comprising the following method steps: feeding an illumination beam into an illumination input of an illumination arrangement with a focusing optical system with a set depth of focus along an optical axis; and generating intersection points of rays of the illumination beam with the optical axis in an axis intersection region, which extends over at least the depth of focus of the focusing optical system along the optical axis.

The illumination arrangement according to embodiments of the invention, the microscope according to embodiments of the invention and the method according to embodiments of the invention can be further improved by the following configurations, which are respectively combinable independently of one another.

The sample-side illumination output can also be referred to as illumination output or sample-side output. The geometric modification of the illumination beam path should be understood to mean a variation of the geometric parameters of the propagation of same, for example the direction or convergence/divergence of the illumination beam path. Spectrally dependent propagation parameters can likewise be modified by the optical modification element.

In particular, the illumination arrangement according to an embodiment of the invention can have an axis intersection region, which extends along the optical axis over a length greater than the length of an axis intersection region of a known illumination arrangement without an optical modification element according to an embodiment of the invention. Consequently, the length of the axis intersection region, as measured along the optical axis, becomes shorter if the optical modification element is removed from the illumination arrangement according to an embodiment of the invention. Conversely, the addition of the optical modification element according to an embodiment of the invention to a known illumination arrangement increases the length of the axis intersection region of the illumination arrangement.

The depth of focus can be defined by way of the area or by way of the intensity of the focused beam. The cross-sectional area perpendicular to the propagation direction can double or the intensity can halve within the depth of focus.

The depth of focus can preferably be the Rayleigh-type depth of focus defined by Rayleigh.

The depth of focus should be considered to be the length, in particular as the length of the path along the propagation direction, over which the diameter of the beam, for example the FWHM diameter (i.e., the diameter of the full width at half maximum) does not change significantly (i.e., for example, double).

For paraxial rays, the depth of focus can be defined or be described by way of the Rayleigh length.

In particular, the axis intersection region, in which the different rays of the illumination beam intersect the optical axis, can extend over at least three, four, five or more than 10 or 20 depths of focus.

According to an embodiment of the invention, an illumination beam is consequently distorted in such a way that the intersection points of the rays of the illumination beam with the optical axis extend or are distributed over at least the depth of focus of the focusing optical system.

The Rayleigh length is a property defined in Gaussian optics and is defined as the propagation distance over which the area of the beam cross section doubles or the beam radius has increased by a factor of $\sqrt{2}$, as measured from the beam waist of the focused beam. Twice the Rayleigh length can be referred to as depth of focus. The Rayleigh length is only defined for paraxial beams. For more strongly focused beams, the depth of focus can be approximated, e.g., by way of the formula $\lambda/NA^2$, where $\lambda$ is the wavelength of the beam and NA is the numerical aperture of the focusing optical system.

As already described above, the Rayleigh length originates from the consideration of Gaussian beam propagation but it represents a fixed property of the optical system when illuminating the pupil of the focusing optical system with the given numerical aperture (NA<0.4) with a beam with a Gaussian profile and an unmodified wavelength (see above for NA>0.4).

It may be possible for the employed objectives to be able to be stopped down such that it is possible to consider an aperture used effectively by the objective. In general, the latter is smaller than the aperture in the case of the full illumination of the objectives of a given NA. An effective aperture reduces the NA, with a reduction in the NA likewise being possible as a result of incomplete illumination, i.e., by an under-illumination of the objective.

The intersection points of the different rays of the illumination beam with the optical axis, the optical axis being able to be set by the focusing optical system in particular, originate from considerations of geometric optics in contrast to the Rayleigh length. However, since the Rayleigh length or the depth of focus is considered to be a characteristic feature of an optical system, there is no inconsistency in relating the axis intersection region, which contains all intersection points of the different rays of the illumination beam with the optical axis, with the Rayleigh length.

The illumination arrangement according to an embodiment of the invention can be configured to receive illumination beams that are monochromatic or comprise a plurality of wavelengths and output said illumination beams on the sample side.

The focusing optical system can be a diffraction-limited optical system without or with minimized imaging aberrations.

In a further configuration of the illumination arrangement according to an embodiment of the invention, the optical modification element can comprise at least one lens with a spherical aberration or a lens system with a spherical aberration. By way of example, this can easily be realized by virtue of using spherical lenses with a large aperture.

Additionally, it is possible to choose an orientation of the lens which causes spherical aberrations. By way of example, the refraction of the illumination beam may not be distributed uniformly on the boundaries of the lens or the lens system. Use can likewise be made of a lens specifically constructed and polished with a spherical aberration. The exemplary and non-restrictive configurations of the optical modification element consequently are (a) a spherical lens, (b) an aspherical lens which is operated differently to its specification, or (c) a lens or optical unit of any form having spherical aberrations.

In general, the deviation or the offset of the intersection points of different rays of the illumination beam depends on the distance of the respective rays from the optical axis in the entry pupil. On an illumination-side object side of an optical system (i.e., not in the pupil) such as the illumination arrangement, it is the different angles of the rays that may cause a spherical aberration.

Likewise, optical systems that provide for the use in an immersion liquid can be operated without this immersion liquid. Such a mismatch already leads to spherical aberrations.

The illumination arrangements from the prior art are usually corrected with great outlay to the effect of supplying aberration-free foci. The deliberate distortion, i.e., the application of a spherical aberration, is advantageous in that the depth of focus (two-times the Rayleigh length) of the illumination beam, in particular of the light sheet, can be increased in the thickness direction with only a small increase in the narrow cross section, or even maintaining said cross section in the ideal case.

Beams with spherical aberration which form a light sheet have a characteristic transverse beam profile. The latter is substantially characterized in that the intensity of the illumination beam has a broad base along the direction perpendicular to the propagation direction, said base generally having a central peak, i.e., an intensity maximum. The peak is composed of the foci (within the meaning of intersection points of the rays with the optical axis) of the different rays of the illumination beam, with the foci being spaced apart from one another along the optical axis and extending over the axis intersection region.

By contrast, at the considered position of the optical axis in the propagation direction of the illumination beam, the base comprises those rays of the illumination beam which either are not yet in focus (i.e., these rays intersect the optical axis at a position downstream in the propagation direction) or are already defocused (i.e., these rays were focused at a position further upstream along the propagation direction and have become defocused again at the considered position).

In general, the intensity of the illumination beam in the base is less than in the peak and can be, for example, merely less than 25% or even less than 10% of the intensity of the peak. In particular, it is advantageous if the power, i.e., intensity×area, is no greater in the peak than in the base.

The narrow peak can be used to illuminate a narrow region of the sample over a length that is greater than the depth of focus of the diffraction-limited, aberration-free focusing optical system.

By contrast, the base illuminates a significantly larger region around the peak (as seen in a thickness direction, where the thickness direction is oriented perpendicular to the propagation direction of the illumination beam).

In the case of a static light sheet, no spherical aberration or hardly any spherical aberration can generally be observed in the plane of the light sheet.

In the virtual light sheet, the spherical aberration can occur on both axes perpendicular to the propagation direction. The spherical aberration in the plane is averaged by the scanning, but the spherical aberration is disadvantageous in view of the base along the thickness direction.

In a further configuration, the illumination beam can have a spherical aberration only in the thickness direction or only such a spherical aberration is able to be impressed on the beam by the optical modification element.

Since the aforementioned microscopes and methods of microscopy are based on selectively illuminating a sample in a narrow region by means of a light sheet, the base can consequently reduce the quality of the imaging of the illuminated region.

In particular, the spherical aberration may occur in anisotropic fashion in the light sheet. Preferably, the aberration can occur in a plane of the light sheet which is spanned by the propagation direction and the thickness direction.

A phase modulator can be provided in a further configuration of the illumination arrangement according to an embodiment of the invention, said phase modulator changing the phase of the illumination beam on the basis of the relative spatial position with respect to the optical axis. Consequently, a corresponding method according to an embodiment of the invention is characterized in that the phase of the illumination beam is locally changed therein on the basis of the relative spatial position with respect to the optical axis.

Consequently, the phase modulator applies a spherical aberration to the focusing optical system or is able to amplify the spherical aberration if the focusing optical system already has this.

By way of example, the phase modulator can be configured as a deformable mirror which either has a spherical form or, in particular, can be deformed in such a way that spherical aberrations can be applied to the illumination beam.

The deformable mirror realizes a phase change by changing the path of individual components or rays of the illumination beam. A spatial light modulator which allows a spatial change in the refractive index and consequently changes an optical path length on the basis of position can likewise be used as a phase modulator. The spatial light modulator can apply a spherical aberration and, in particular, a changeable spherical aberration to the illumination beam, i.e., distort the illumination beam.

If a fixed change in the phase is desired, the phase modulator can be configured as a static diffractive phase plate. The latter acts like a spatial light modulator with, however, the regions of different refractive index being static and unchangeable.

In the method according to an embodiment of the invention, therefore, the illumination beam is distorted by means of the phase modulator, which is configured as a deformable mirror, a spatial light modulator or static (diffractive) phase plate, and so the intersection points of the rays of the illumination beam with the optical axis extend or are distributed over at least twice the depth of focus of the focusing optical system.

In a further configuration of the illumination arrangement according to an embodiment of the invention, the optical modification element can be configured as a three-dimensional solid body with a predetermined refractive index and can be arranged on the sample side of the focusing optical system. Such an optical modification element is advantageous in that, in its simplest form, it can be configured as a glass block, stepped element or stepped pane. The glass block, the stepped element or the stepped pane can be introduced into the beam path between the focusing optical system and the sample and, in this position, leads to the relative focal position being displaced axially (along the propagation direction of the illumination beam) and simultaneously having the spherical aberration impressed thereon.

In a further configuration of the illumination arrangement according to an embodiment of the invention, provision can be made of at least one light source, at the output of which the illumination beam is output and fed into the illumination input.

The light source can be a monochromatic light source or comprise a spectrum of a plurality of wavelengths. The light source can further contain collimation optical units, which collimate the light emitted by the light source and output a collimated, i.e., parallel, illumination beam.

It is likewise possible for the light source to contain optical units which focus the illumination beam at a focus. In such a configuration, the focusing optical system of the illumination arrangement can be configured, in particular, in the so-called 4f setup, i.e., the focus generated by the optical units of the light source is located in the object-side focal length of the focusing optical system.

In a further configuration of the illumination arrangement according to an embodiment of the invention, the at least one light source can have a focus of the illumination beam, wherein the relative position of the focus can be formed along the optical axis, offset from a (nominal) illumination-side focal plane of the focusing optical system. The objective can be "calculated", i.e., optimized, for this nominal illumination-side focal plane.

Expressed differently, the setup of the illumination arrangement in this configuration deviates from the 4f setup. In a conventional 4f setup, light is radiated at least in approximately collimated fashion into the objective, i.e., the objective is optimized ("calculated") for this case. Consequently, focusing as described in the paragraph above is realized, in particular, if convergent or divergent light is radiated into an objective. This deviation from the conventional 4f setup applies a spherical aberration to the illumination beam. Further, a focusing optical system operated in this arrangement can specifically be constructed to admit incoming radiation of the illumination beam in an optical arrangement which does not correspond to the 4f setup without blocking or curtailing parts of the illumination beam in the focusing optical system. Expressed differently, the focusing optical system can be adapted, in particular, to an arrangement or illumination deviating from the 4f setup.

It is likewise possible to introduce a further lens into the beam path in order consequently to deviate from the 4f setup and obtain a non-telecentric optical system. This can also apply a spherical aberration to the illumination beam.

In a further configuration of an embodiment of the invention, the magnitude of the applied spherical aberration can be adaptable to the size of the object to be examined.

If the plane of the light sheet is defined as xy-plane and if the thickness direction of the light sheet is defined as the direction of the z-axis, the light emitted by the sample is detected along the z-axis in the example of a SPIM microscope. In this case, the x-axis is the axis corresponding to the longitudinal direction, i.e., the propagation direction of the light sheet, and hence an optical axis of the illumination arrangement.

Expressed differently, an optical axis of a detection optical unit is oriented perpendicular to the light sheet. The above-described transverse beam profile of a beam with spherical aberrations, comprising a peak and a base, consequently arises if the illumination intensity in the light sheet is plotted as a function of the position along the z-axis.

Axial modulations, i.e., modulations of the light intensity along the optical axis, may arise in the light sheet by applying spherical aberrations to the illumination beam. These axial modulations arise due to interference of the rays of the illumination beam arising due to the aberrations: rays of the illumination beam intersect at different points within the light sheet. In mutually coherent rays, this results in an inhomogeneous intensity distribution in the xy-plane (in which the light sheet is formed) along the x-axis on account of interference of the rays with one another.

These axial modulations can be reduced or even avoided by virtue of using a light source with a short coherence length. Axial modulations only occur within the coherence length of the utilized light source, and so, by way of path differences, the interference range can be left and a homogeneous light sheet can be generated. Preferably, the coherence length of the employed light source is shorter than the depth of focus, particularly preferably shorter than half of the depth of focus and very particularly preferably less than one quarter of the depth of focus. Incoherent light sources or broadband light sources such as, e.g., a white light laser can meet this requirement of a short coherence length. Short pulse lasers and ultrashort pulse phases might also be suitable for avoiding modulations since these have a short coherence length (for example, approximately 30 µm in the case of a pulse length of 100 fs).

Particularly preferably, the light source, for example a broadband laser light source or a white light source, has a coherence length of less than 1 mm, preferably less than 0.5 mm and further preferably <100 µm. Such a laser light source, in particular a short pulse laser or ultrashort pulse laser, preferably has a pulse duration of the light pulses emitted thereby which is less than 5 ps, preferably <2 ps, further preferably <1 ps and particularly preferably in the region of the few 100 femtoseconds.

Purely by way of example and not in any way restrictive, Ti:sapphire lasers, Nd- or Yb-based lasers and lasers which broaden the optical spectrum output thereby, for example in a filament, i.e., generally in a non-linear optical apparatus, and consequently represent a broadband light source, up to an octave-spanning light source, are mentioned as possible laser light sources.

Consequently, the illumination arrangement according to an embodiment of the invention can have at least one light source from the list comprising: —an incoherent light source; —a broadband light source; —a white light laser; —a short pulse laser; and—an ultrashort pulse laser.

The light source can preferably emit light pulses with a duration less than 1 picosecond (ps) and/or have a coherence length shorter than 100 micrometers (µm).

Alternatively, the illumination beam that forms the light sheet can also oscillate provided the exposure time of the detector used to detect the light emitted by the sample is chosen in such a way that axial modulations are averaged out. As a result of this averaging, for which the exposure time is greater than the period duration of the change of the interference over the time, it is therefore likewise possible to obtain a light sheet that homogeneously illuminates the sample.

As a matter of principle, there are two possible procedures for reducing or avoiding the occurring, unwanted interferences, i.e., the axial modulations. As a first option, an occurrence of interference can be largely avoided by the choice of a suitable coherence length of the utilized illumination light, i.e., in particular by a suitable choice of the light source. This is presented above in relation to light sources with a short coherence length.

However, if the illumination beam strikes a symmetrically formed modification element in symmetric fashion, marginal rays modified by the optical modification element, which are opposite one another in relation to the optical axis and have the same distance from the optical axis, will exhibit interference at their crossing point. However, the spatial region in which the interferences occur is locally restricted by the coherence length and, furthermore, there is an unimpeded superposition with other rays of the illumination beam in this locally restricted region in any case, with these further rays of the illumination beam not satisfying the coherence conditions and consequently being able to lead to a homogeneous increase in intensity in the locally restricted area.

A further option for reducing or avoiding axial modulations on account of interference is that of using suitable countermeasures to average out said axial modulations after the creation or during the creation thereof. As already mentioned above, this can be implemented by an oscillation of the axial modulations, which can be caused by a moving element, for example. In such a configuration, the axial modulations move with the moving optical element, but this movement can be chosen in such a way that it is faster than an exposure time of the detection apparatus. That is to say that, for example, the period duration of a vibration of the moving optical element is greater than the recording time (the time during which an image representation of the light sheet is imaged on a detector and a corresponding electrical signal is generated). This leads to changes in the detected light intensity that are faster than the recording time being captured in integrated, i.e., averaged, fashion and the axial modulations consequently not being detected or recorded.

Further, it is likewise possible to remove the obtained axial modulations in a subsequent step, i.e., after the image of the light sheet has been recorded, by calculation. The axial modulations can be initially ascertained and analyzed by means of a suitable program executable on a computer (e.g., by a Fast Fourier Transform, FFT) and subsequently be filtered out by an appropriate application of filters, e.g., software filters, such that a homogeneous intensity distribution of the light sheet arises.

To this end, provision can be made of reference or calibration measurements, in which a known sample is illuminated and detected. The necessary settings for ascertaining the axial modulations and for removal of same can be stored in a non-volatile storage device and can be read when recording further images of the light sheet and be applied to the measured data. Consequently, only one calibration measurement may be necessary to free further images of the light sheet automatically from the axial modulations by way of the application of the calculation rules and/or filters ascertained and stored in advance.

In further configurations, the method according to embodiments of the invention can comprise the following method steps in order to further increase the quality of the imaging: generating at least two illumination beams to which spherical aberrations have been applied; superposing the at least two illumination beams on the sample side and generating interference structures on account of the superposition; and (a) varying the relative position of the interference structures and evaluating the obtained interference structures for the purposes of increasing the contrast or (b) making the interference structures oscillate for the purposes of homogenizing the illumination intensity of the light sheet.

By means of these configurations, it is possible to separate the detected components of the sample which were illuminated by the base of the transverse cross section of the illumination beam in the sample, i.e. of the light sheet, from the components of the peak.

The at least two illumination beams are preferably superposed on one another at an angle and are preferably displaceable with respect one another. By way of example, this can be a mirror that has been provided with a piezo element.

Since the base of the transverse beam profile comprises the components of individual rays of the illumination beam not yet in focus or already defocused, interferences of these beam components can form here, but since these are not located in the nominal focal plane of the detection objective but upstream or downstream thereof along the corresponding optical axis, the interferences are imaged in a manner very washed out or unsharp by the detection objective, and so no identifiable interference structures of the base are imaged.

The beam components in the peak of the transverse beam profile likewise interfere with one another while forming clear interference structures and form an interference pattern which is imaged sharply, however.

Now, for a method according to (a), the at least two illumination beams can be displaced relative to one another, with the displacement preferably being implemented by an integer fraction such as ⅓ (e.g., also ½; ¼; ⅕ etc.) of a spatial period of interference strips. This shift only changes the signal from the focal plane of the detection optical unit, whereas the signal components of the base do not change. By subsequent combination by calculation of at least three (2; 4; 5 etc.) recorded data records, it is possible to mask the background generated by the base and the contrast can be increased.

Expressed differently, the configuration of the method according to (a) describes an optical high-pass filter. It separates the interference structures with a high spatial frequency in the focal plane of the detection optical unit (this focal plane corresponds to the xy-plane, in which the light sheet is formed, in particular the light sheet formed by the peak) from the low-frequency components, which are situated above or below the focal plane in the direction of the optical axis of the detection optical unit.

Alternatively, the generated interference structures can be displaced with respect one another in oscillating fashion in a configuration of the method according to (b). By way of example, the interference structures can be made to oscillate by an oscillation of the illumination beam and hence said interference structures can be averaged out and the light sheet can be homogenized thereby.

In the following, embodiments of the present invention are explained in more detail on the basis of exemplary drawings. The technical features of the different drawings can be combined as desired or omitted if the technical effect of the omitted technical feature is not important. Same elements and elements of the same function are provided with the same reference sign for overview reasons.

FIG. 1 schematically illustrates a microscope 1 on the basis of an SPIM microscope 3. The SPIM microscope 3 can also be referred to as a light sheet microscope 3.

The SPIM microscope 3 from the prior art shown in FIG. 1 comprises an illumination input 5, by means of which an illumination beam 7 can be coupled into the illumination arrangement 9, and a sample-side illumination output 6, through which the illumination beam 7 can be output. The illumination arrangement 9 shown further comprises a tube lens 11 and a focusing optical system 13, which is configured in the form of an illumination objective 15.

The illumination beam 7 is fed into the illumination arrangement 9 along an optical axis 17 and also output along the optical axis 17 on a sample side 19.

On the sample side 19, the different rays 21 of the illumination beam 7 are focused in the focal range 23. The focal range 23 is spaced apart from the focusing optical system 13 at a working distance 24 and is located in a sample volume 26. Situated in the latter is the image-side focal plane 43 of the illumination arrangement 9. The object-side focal plane 45 is shown to the left in FIG. 1. Of the various rays 21, only three have been provided with a reference sign between the tube lens 11 and the illumination objective 15. One ray 21 coincides with the optical axis 17.

The focal range 23 is illustrated in magnified fashion in FIG. 1, with the magnified part 25 schematically showing Gaussian beam propagation. The non-magnified focal range 23 is illustrated according to the model of geometric optics.

In this illustration, the illumination beam is constricted down to a beam waist 27. The beam waist 27 can be numerically captured with the aid of a beam waist radius 28 and denoted with wo. Twice the beam waist radius 28 corresponds to a beam diameter 27a at the beam waist 27. For overview reasons, the latter is plotted with a slight offset to the beam waist 27.

The focal range 23 is further characterized by the so-called Rayleigh length 29. The Rayleigh length 29 characterizes the distance measured along an x-axis between the relative position of the beam waist 27 and a position in the direction or counter to the direction of the x-axis, at which the beam diameter 27a has increased in size by a factor of √2 (square root 2) in comparison with the beam waist 27. Twice the Rayleigh length 29 can also be referred to as depth of focus 31. Within the depth of focus 31, a broadening of the focal range 23 along a thickness direction 33 corresponding to the y-axis can be neglected.

In the case of a static light sheet, the focal range 23 is not arranged in rotationally symmetric fashion with respect to the optical axis 17. In the direction counter to and in the direction of the z-axis, the shown focal range 23 does not change; i.e., the focal range 23 forms a light sheet 35 which extends in a y-direction and an x-direction, i.e., in an xy-plane.

Further, the SPIM microscope 3 comprises a detection optical unit 37, which is configured as a detection objective 39. The detection optical unit 37 further has a second optical axis 41, which is arranged perpendicular to both the light sheet 35 and the optical axis 17 of the illumination arrangement 9.

Figure 2:
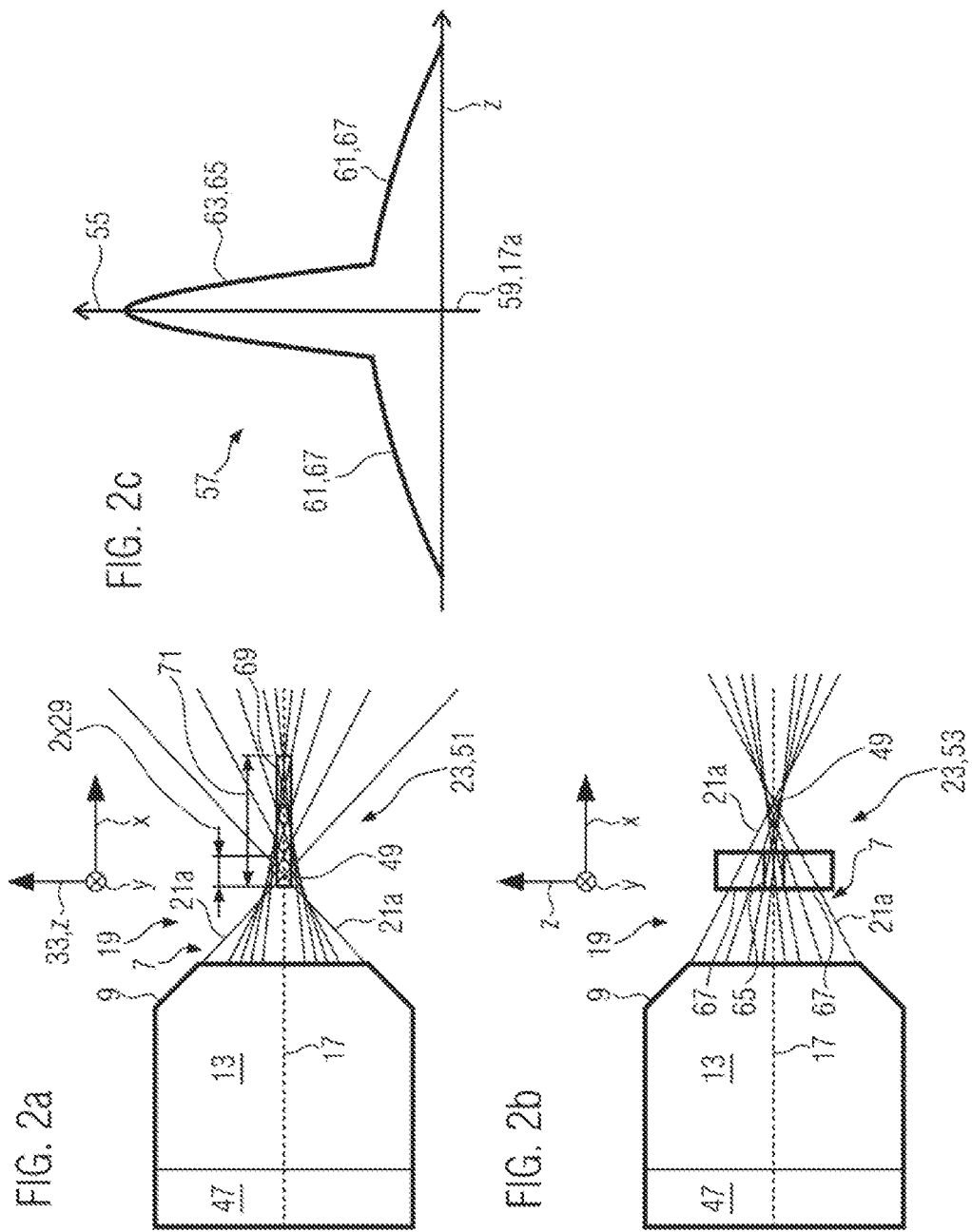
FIGS. 2a-2c show spherical aberrations of the illumination arrangement according to an embodiment of the invention and transverse beam profiles.

FIGS. 2a and 2b show different configurations of the illumination arrangement 9 according to embodiments of the invention. Both illustrations schematically show that the illumination arrangement 9 comprises the focusing optical system 13 and an optical modification element 47.

On the sample side 19, it is possible to identify that marginal rays 21a in the configuration of the illumination arrangement 9 shown in FIG. 2a are too strongly deflected and intersect the optical axis 17 at an intersection point 49 which has a shorter distance from the focusing optical system 13 than the further intersection points 49. The further intersection points 49 have not been provided with reference signs. This case of the focal range 23 of the illumination arrangement 9 shown in FIG. 2a is referred to as positive spherical aberration 51.

In the configuration of the illumination arrangement 9 shown in FIG. 2b, the marginal rays 21a intersect the optical axis 17 at an intersection point 49 which is further away from the focusing optical system 13 than the further intersection points 49 (not provided with reference signs). Consequently, negative spherical aberration 53 occurs in the focal range 23 of the configuration of the illumination arrangement 9 shown in FIG. 2b.

If an intensity 55 of the illumination beam 7 is plotted along the z-axis as a function of the relative position on the z-axis in one of the focal ranges 23 shown in FIGS. 2a and 2b, an intensity distribution 57, which plots the intensity 55 along the z-axis, as illustrated schematically in FIG. 2c is obtained.

The z-coordinate of a coordinate origin 59 corresponds to the relative position of the optical axis 17a.

The intensity distribution 57 comprises a base 61 and a peak 63, with the peak 63 being composed of focused components 65 and the base 61 being composed of non-focused components 67. These are represented schematically by rectangles in FIG. 2b.

The non-focused components 67 can be beam components which are located between the illumination arrangement 9 and the corresponding intersection point or points 49, i.e., beam components that have not yet been focused. Likewise, the non-focused components 67 comprise beam components which are located behind the corresponding intersection point or points 49 as seen from the illumination arrangement 9, i.e., beam components in which the corresponding rays 21 are already defocused.

The intensity distribution shown in FIG. 2c can be obtained along the y-axis within an axis intersection region 69 in the illumination arrangement 9 according to an embodiment of the invention. The axis intersection region 69 is illustrated schematically by means of a rectangle in FIG. 2a. In the illumination arrangement 9 according to an embodiment of the invention, the length 71 of the axis intersection region 69 is greater than twice the Rayleigh length 29, which is plotted schematically in FIG. 2a.

Figure 3:
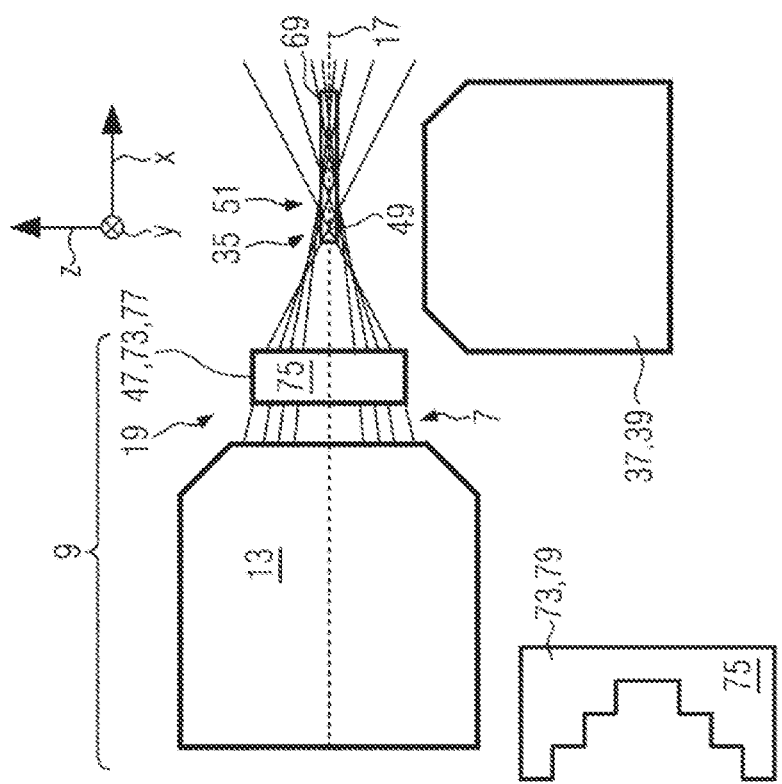
FIG. 3 shows a further configuration of the illumination arrangement according to the invention.

FIG. 3 shows a further configuration of the illumination arrangement 9 according to an embodiment of the invention. In this configuration, the optical modulation element 47 is arranged on the sample side 19 of the focusing optical system 13. In the configuration shown in FIG. 3, said modulation element is a three-dimensional solid body 73, which has a predetermined refractive index 75.

The shown three-dimensional solid body 73 is configured as a glass block 77 and can also be replaced by a stepped element 79 in a further configuration. The latter permits a thickness variation and a displacement of the focus, and hence permits axial modulations to be compensated. In a configuration according to an embodiment of the invention, the three-dimensional solid body 73 can be replaced by a lens. It is likewise conceivable for the solid body 73 to be configured as a transparent object with a refractive index that deviates from the refractive index for which the objective is provided, i.e., constructed and optimized.

The stepped element 79 is shown schematically outside of the beam path in FIG. 3, with it being identifiable that the former is characterized by steps that taper toward the optical axis 17 and consequently corresponds to a three-dimensional solid body that is composed of a plurality of glass blocks 77. Further, the use of a rotationally symmetric stepped element 79 is also conceivable, particularly when generating a virtual light sheet.

In the illumination arrangement 9 according to an embodiment of the invention, the three-dimensional solid body 73 applies a positive spherical aberration 51 to the illumination beam 7 and forms a multiplicity of intersection points 49, which extend within the axis intersection region 69. The forming light sheet 35 extends in the x-direction and has an intensity distribution 57 along the z-axis as shown in FIG. 2c.

The light sheet 35 illuminates a sample, the scattered or reflected light of which is collected by the detection optical unit 37 configured as a detection objective 39, transmitted to a detector and detected by the detector.

Figure 4:
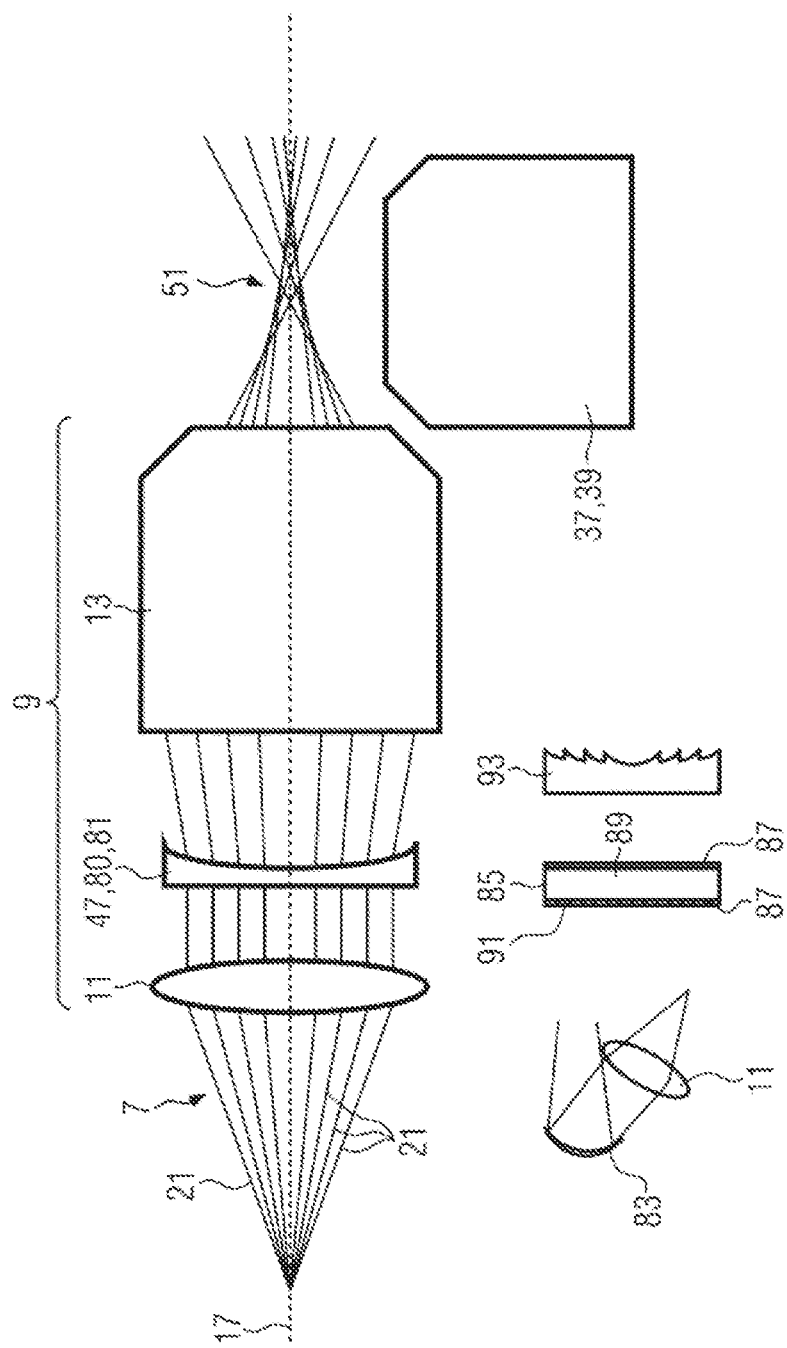
FIG. 4 shows a further configuration of the illumination arrangement according to an embodiment of the invention.

FIG. 4 shows a further configuration of the illumination arrangement 9 according to an embodiment of the invention. This configuration is similar to the structure from the prior art shown in FIG. 1; i.e., it comprises a tube lens 11 and the focusing optical system 13.

However, the configuration of the illumination arrangement 9 according to an embodiment of the invention shown in FIG. 4 additionally comprises the optical modification element 47, which is configured as a phase modulator 80, more particularly as a compensation plate 81. In general, the compensation plate 81 is used to compensate spherical aberrations but, in the configuration shown in FIG. 4, it leads to over or under compensation of the spherical aberration, which is identifiable on the sample side 19 of the focusing optical system 13.

FIG. 4 further shows three options for configuring the optical modification element 47. These can replace the compensation plate 81 introduced into the beam path. By way of example, deformable mirrors 83 are conceivable, although these presume a deflection of the beam path (different relative position of the tube lens 11).

Moreover, the use of a spatial light modulator 85 which consists of two electrodes 87 and, for example, a layer of liquid crystals 89 is possible. One electrode 87 of the spatial light modulator 85 is configured as a pixel electrode 91, different voltages being able to be applied to the individual pixels thereof.

FIG. 4 shows a static diffractive phase plate 93, which generates a fixed phase change of the incoming illumination beam 7 on the basis of the distance of the individual rays 21 from the optical axis 17.

Figure 4A:
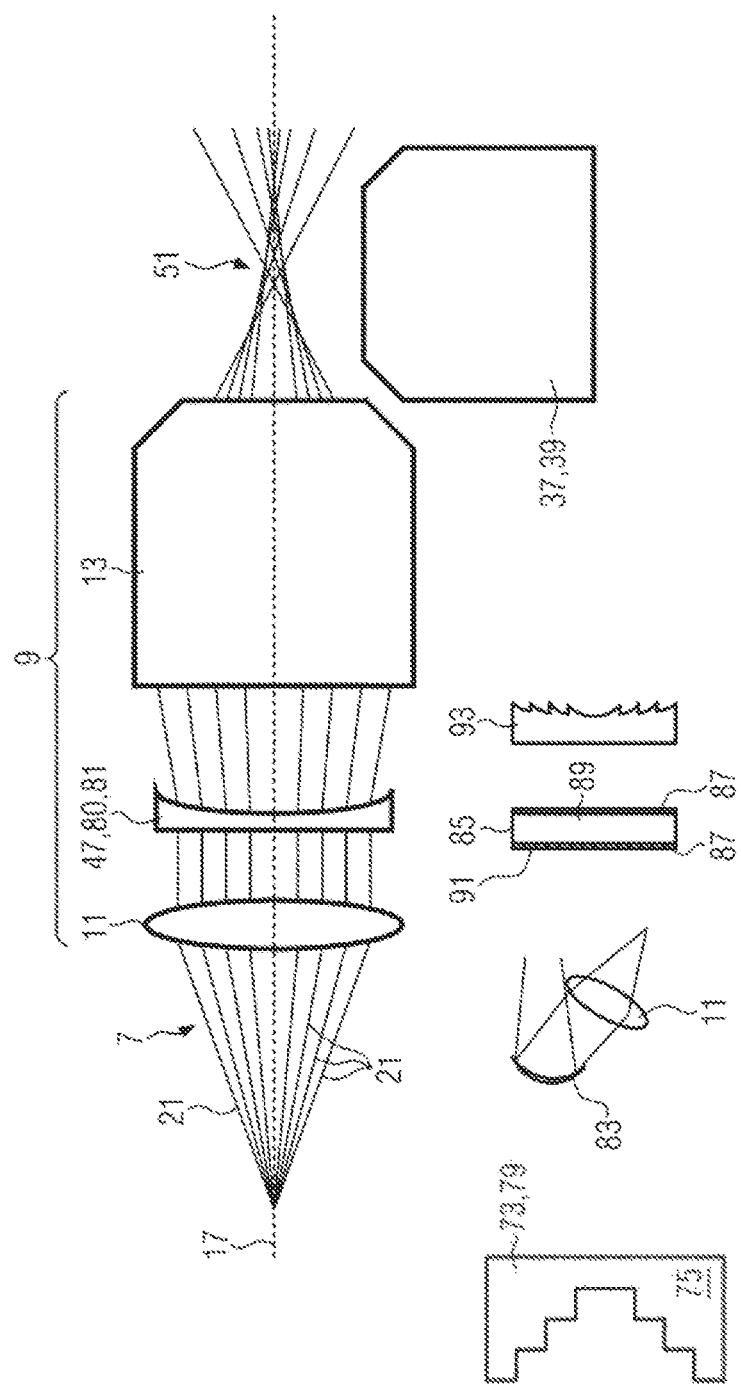
FIG. 4a shows a further configuration of the illumination arrangement according to an embodiment of the invention.

In comparison with FIG. 4, FIG. 4a further shows that the optical modification element 47 can be replaced by a stepped element 79. The latter permits a thickness variation and, therewith, a displacement of the focus and consequently a compensation of axial modulations.

The stepped element 79 is likewise shown schematically outside of the beam path in FIG. 4a, with the explanations above in relation to the stepped element 79 of FIG. 3 also applying to the stepped element 79 shown in FIG. 4a.

The optical modification element 47 could be one of the aforementioned possible configurations of the optical modification element 47, for example a glass block 77, a stepped element 79, a phase modulator 80, a compensation plate 81, a deformable mirror 83 or a spatial light modulator 85. These can be arranged between the light source 17 and the focusing optical system 13, more particularly the tube lens of the system 13, as shown in FIG. 4a. This corresponds to an illumination side.

However, it is likewise possible for the aforementioned possible configurations of the optical modification element 47 to be arranged on the sample side 19. This is shown purely by way of example in FIG. 2b and FIG. 3.

Figure 5:
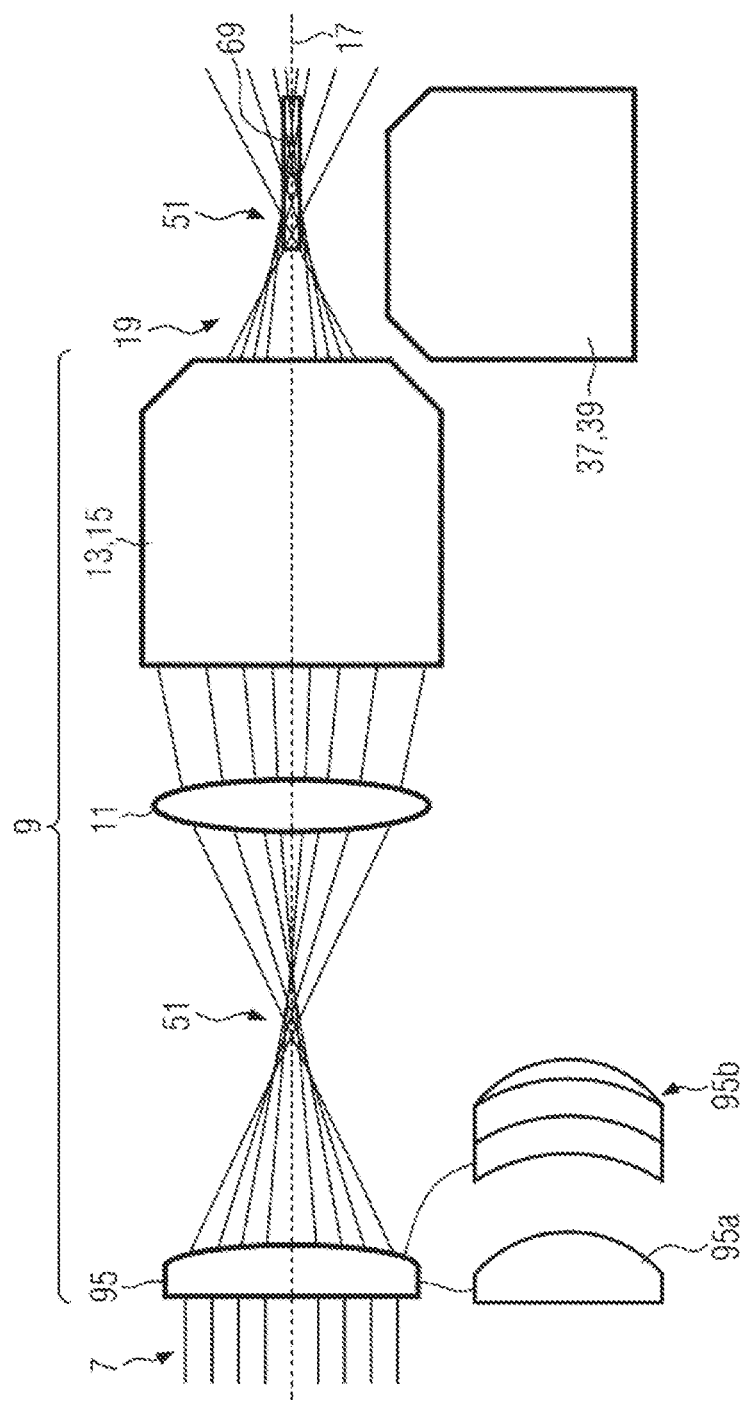
FIG. 5 shows a further configuration of the illumination arrangement according to an embodiment of the invention.

FIG. 5 shows a further configuration of the illumination arrangement 9 according to an embodiment of the invention, wherein a specifically formed aspherical optical unit 95 has been introduced into the beam path in front of the tube lens 11. Said aspherical optical unit applies to the illumination beam 7 a positive spherical aberration 51, which is transferred by the tube lens and the focusing optical system 13 to the sample side 19 such that the axis intersection region 69 also forms on the sample side 19.

By way of example, the aspherical optical unit can be configured as a lens 95a with a spherical aberration 51, 53 or else as a lens system 95b with a spherical aberration 51, 53.

Figure 6:
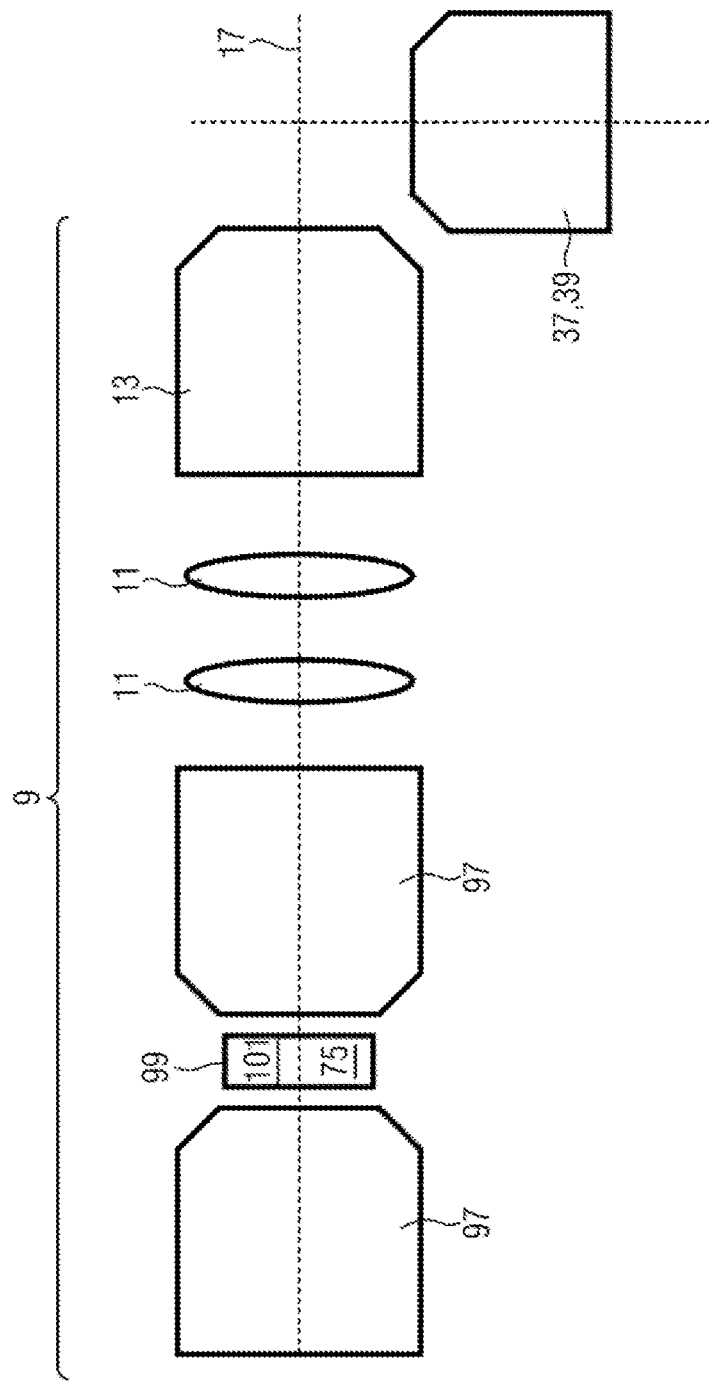
FIG. 6 shows a further configuration of the illumination arrangement according to an embodiment of the invention.

FIG. 6 shows a further configuration of the illumination arrangement 9 according to an embodiment of the invention. In addition to the focusing optical system 13 and two tube lenses 11, it additionally comprises two additional relay objectives 97 and a tank 99 arranged between the relay objectives 97. A medium 101 with a refractive index 75 is situated in the tank 99.

The shown arrangement of the relay objectives 97 with the tank 99 is corrected to the effect of the arrangement of the relay objectives 97 having no spherical aberrations in the case of a correctly selected medium 101, i.e., a medium 101 with defined refractive index 75.

However, the medium 101 shown in FIG. 6 has a refractive index 75 that deviates from the predetermined refractive index 75. Consequently, the arrangement of the relay objectives 97 applies a spherical aberration to the illumination arrangement 9. For the sake of clarity, FIG. 6 only plots the optical axis 17, but not all beam paths.

Figure 7:
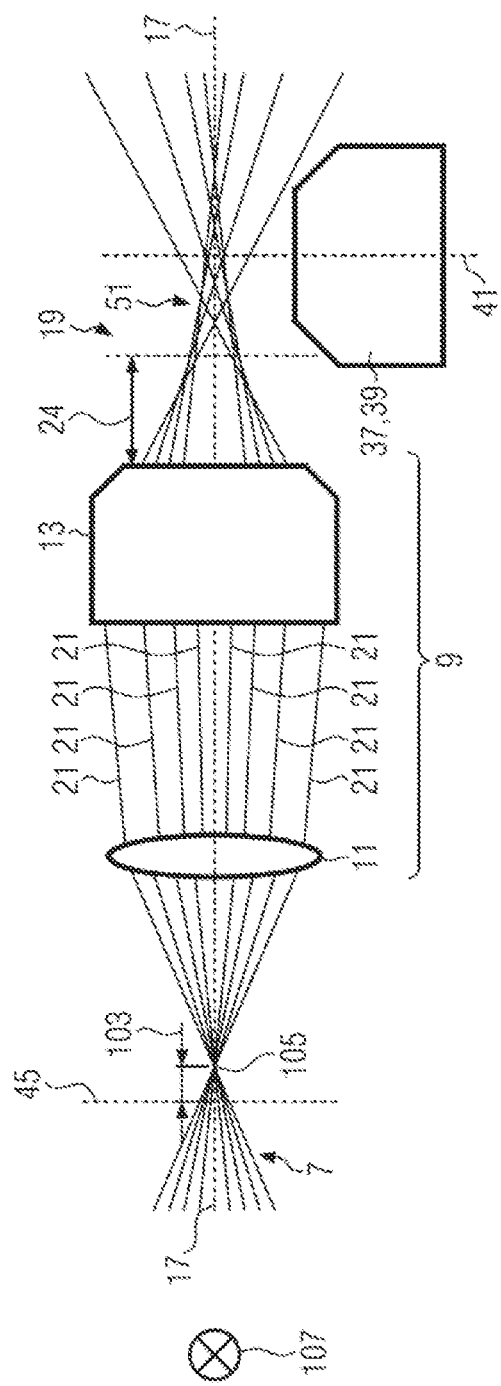
FIG. 7 shows a further configuration of the illumination arrangement according to an embodiment of the invention.

FIG. 7 shows a further configuration of the illumination arrangement 9 according to an embodiment of the invention. This is similar to the structure of the prior art shown in FIG. 1, with, however, the illumination beam 7 irradiated into the illumination arrangement 9 no longer being focused in the object-side focal plane 45. This leads to the rays 21 no longer extending in parallel to the optical axis 17 between the tube lens 11 and the focusing optical system 13 and consequently causing a spherical aberration 51 on the sample side 19 of the illumination arrangement 9.

The offset 103 of the focus 105 of the schematically indicated light source 107 along the optical axis 17 from the object-side focal plane 45, also referred to as illumination-side focal plane 45, consequently causes the positive spherical aberration 51.

In the configuration of the illumination arrangement 9 according to an embodiment of the invention shown in FIG. 7, the focusing optical system 13, in particular, can be constructed in such a way that the non-parallel rays 21 are transmitted therethrough and are not blocked. The illumination arrangement 9 of FIG. 7 is not operated in the 4f setup in the configuration shown.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 Microscope
3 SPIM microscope
5 Illumination input
6 Sample-side illumination output
7 Illumination beam
9 Illumination arrangement
11 Tube lens
13 Focusing optical system
15 Illumination objective
17 Optical axis
17a Relative position of the optical axis
19 Sample side
21 Ray 21a Marginal ray
23 Focal range
24 Working distance
25 Magnified part
26 Sample volume
27 Beam waist
27a Beam diameter
28 Beam waist radius
29 Rayleigh length
31 Depth of focus
33 Thickness direction
35 Light sheet
37 Detection optical unit
39 Detection objective
41 Second optical axis
43 Image-side focal plane
45 Objective-side focal plane
47 Optical modification element
49 Intersection point
51 Positive spherical aberration
53 Negative spherical aberration
55 Intensity
57 Intensity distribution
59 Coordinate origin
61 Base
63 Peak
65 Focused components
67 Non-focused components
69 Axis intersection region
71 Length
73 Three-dimensional solid body
75 Refractive index
77 Glass block
79 Stepped element
80 Phase modulator
81 Compensation plate
83 Deformable mirror
85 Spatial light modulator
87 Electrode
89 Layer of liquid crystals
91 Pixel electrode
93 Static diffractive phase plate
95 Aspherical optical unit
95a Lens
95b Lens system
97 Relay objective
99 Tank
101 Medium
103 Offset
105 Focus
107 Light source

The invention claimed is:

1. An illumination arrangement for a microscope for illuminating a sample with a light sheet, the illumination arrangement comprising:
   an illumination input configured to feed an illumination beam along an optical axis of the illumination arrangement;
   an illumination output which faces a sample side and is configured to output the illumination beam to the sample side;
   a focusing optical system with a set depth of focus; and
   at least one optical modification element configured to geometrically modify the illumination beam, wherein the optical modification element is configured to apply a spherical aberration to the illumination beam,
   wherein different rays of the illumination beam intersect the optical axis within an axis intersection region at the illumination output at different positions along the optical axis, and
   wherein the axis intersection region extends over a length along the optical axis that is greater than the depth of focus of the focusing optical system.

2. The illumination arrangement as claimed in claim 1, wherein the at least one optical modification element comprises at least one lens with the spherical aberration or a lens system with the spherical aberration.

3. The illumination arrangement as claimed in claim 1, further comprising a phase modulator configured to change a phase of the illumination beam based on a relative spatial position with respect to the optical axis.

4. The illumination arrangement as claimed in claim 1, wherein the at least one optical modification element is configured as a three-dimensional solid body with a predetermined refractive index and is arranged on the sample side of the illumination arrangement.

5. The illumination arrangement as claimed in claim 1, further comprising at least one light source configured to output the illumination beam and feed the illumination beam into the illumination input.

6. The illumination arrangement as claimed in claim 5, wherein the at least one light source has a focus of the illumination beam, wherein a relative position of the focus is formed along the optical axis, offset from an illumination-side focal plane of the focusing optical system.

7. The illumination arrangement as claimed in claim 5, further comprising a light source that includes at least one of:
   an incoherent light source;
   a broadband light source;
   a white light laser;
   a short pulse laser; or
   an ultrashort pulse laser.

8. The illumination arrangement as claimed in claim 7, wherein the light source emits light pulses with a duration less than 1 ps or has a coherence length shorter than 100 µm.

9. A microscope comprising a sample volume and the illumination arrangement as claimed in claim 1 for illuminating the sample volume with the light sheet.

10. A method for illuminating a sample volume in a microscope, the method comprising:
    feeding an illumination beam into an illumination input of an illumination arrangement, the illumination arrangement having a focusing optical system with a set depth of focus along an optical axis of the illumination arrangement, the illumination arrangement further having at least one optical modification element configured to apply a spherical aberration to the illumination beam; and
    generating, via the illumination arrangement, intersection points of rays of the illumination beam with the optical axis in an axis intersection region, wherein the axis intersection region extends over a length along the optical axis that is greater than the depth of focus of the focusing optical system.

11. The method as claimed in claim 10, further comprising locally changing a phase of the illumination beam based on a relative spatial position with respect to the optical axis.

12. The method as claimed in claim 10, further comprising:
    generating at least two illumination beams;

superposing the at least two illumination beams on the sample side and generating interference structures on account of the superposition; and at least one of:
- (a) varying a relative position of the interference structures and evaluating obtained interference structures to increase contrast, or
- (b) making the interference structures oscillate to homogenize illumination intensity of the light sheet.

13. The microscope as claimed in claim 9, wherein the microscope is a light sheet microscope, selective plane illumination microscopy (SPIM) microscope, oblique plane microscope or swept confocally-aligned planar excitation (SCAPE) microscope.

* * * * *